United States Patent [19]

Fehr

[11] Patent Number: 5,036,610
[45] Date of Patent: Aug. 6, 1991

[54] PET LOCATOR SYSTEM AND METHOD

[76] Inventor: Van Kirk Fehr, 3258 O St., NW., Washington, D.C. 20007

[21] Appl. No.: 607,784

[22] Filed: Oct. 30, 1990

Related U.S. Application Data

[63] Continuation of Ser. No. 248,105, Sep. 23, 1988, abandoned.

[51] Int. Cl.$^5$ ............................................. G09F 3/00
[52] U.S. Cl. ...................................... 40/300; 283/70
[58] Field of Search .................. 40/300, 303, 586; 119/106; 283/70, 74, 75

[56] References Cited

U.S. PATENT DOCUMENTS 4,091,766 5/1978 Colliard ............................. 40/586
4,650,219 3/1987 Sigman ................................ 40/586

Primary Examiner—Cary E. Stone
Attorney, Agent, or Firm—Lowe, Price, LeBlanc & Becker

[57] ABSTRACT

A system for identifying a lost pet and locating its owner includes a central clearing house and a pet collar or tag having a telephone number and a unique code number imprinted thereon. Information about the pet and its owner is stored at the central clearing house under the unique number and is retrievable in response to a telephone call from a finder of the pet.

8 Claims, 2 Drawing Sheets

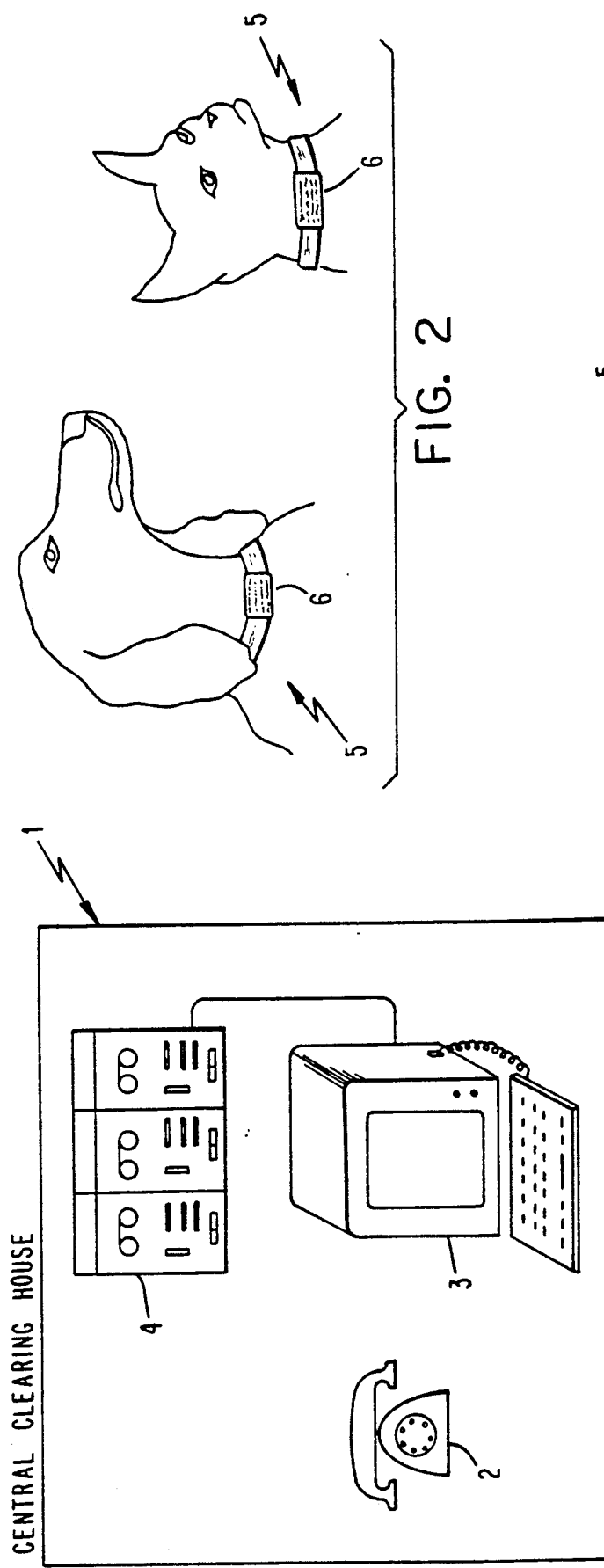
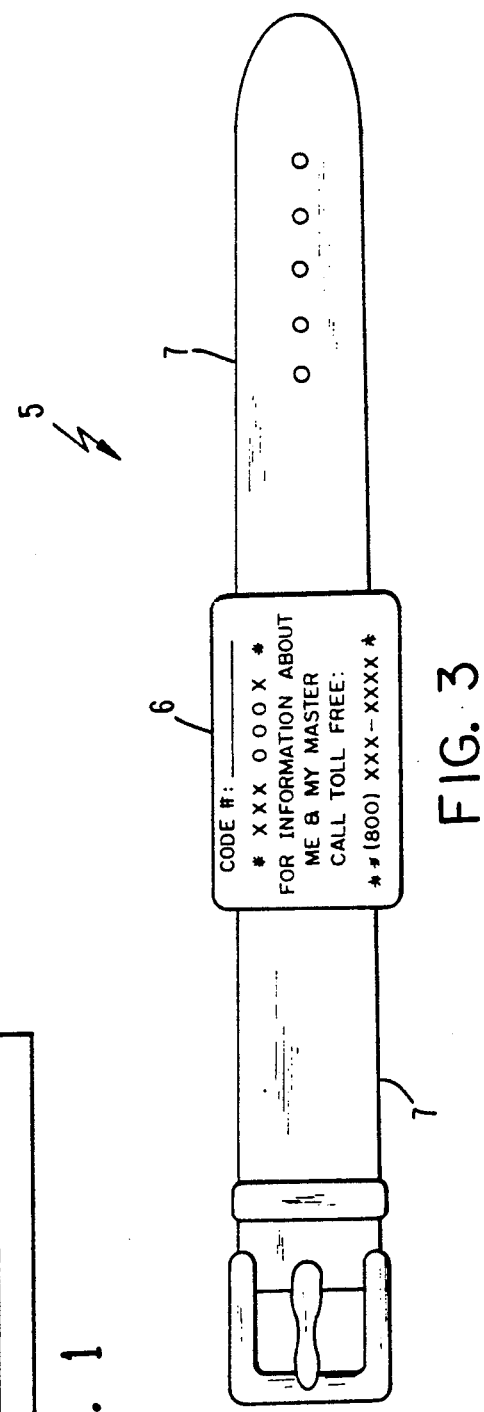

PET LOCATOR SYSTEM AND METHOD

This application is a continuation of application Ser. No. 07/248,105 filed Sept. 23, 1988, abandoned.

FIELD OF THE INVENTION

This invention relates to a system and method for identifying lost pets and locating their owners.

BACKGROUND OF THE INVENTION

There is a special need for a system of identifying lost pets and locating their owners. Each year, millions of stray cats and dogs starve on the streets, become a nuisance, or are picked up by animal control authorities around the country and taken to "shelters" where, if they are not claimed within a few days, they will be executed. Even if they are given or sold by the shelter to a new owner, their previous owners often experience a severe sense of loss akin to losing a member of the family.

It is currently known to provide collars which allow the owner to write identification infromation directly onto the collar or onto a collar tag. However, due to the size of pet collars, only limited information can be provided, and the information cannot be updated unless the information is written in non-permanent form.

It is important that the information be updateable. For example, the owner may move to a different residence, or the owner may wish to transfer the collar to a different pet. However, if the information is not provided in permanent form, there is a good chance it will be destroyed during the normal activities of the pet, due to inclement weather, rough-housing, and so forth.

It is also known to provide collars or tags having pre-printed or engraved personalized information. Again, however, the amount of information that can be placed on the collar or tag is limited, the information is not updateable, and the cost of manufacturing such personalized collars or tags is greatly increased.

In addition, a further drawback of such prior art collars and tags is that many owners do not wish to release their address or phone number unless absolutely necessary. For example, it has not been possible to print unlisted phone numbers on a collar or tag without making the number obtainable simply by checking the collar as the pet wanders around the property of the owner.

Examples of prior art collars having the above drawbacks are shown in U.S. Pat. Nos. 4,137,660, 4,178,879, 4,031,859, 3,585,743 and 1,803,196.

SUMMARY OF THE INVENTION

It is consequently an object of the invention to provide a system for identifying lost pets and locating their owners which does not suffer the drawbacks of the prior art. It is a further object of the invention to provide an improved method for identifying lost pets and locating their owners. Finally, it is an object of the invention to provide a collar or tag for use in the system which is simple to manufacture and which enables the finder of a lost pet to obtain information about the pet and its owner which is accessible through a unique code number and a telephone number permanently affixed to the collar or tag.

In accordance with one aspect of the invention, lost pets are reunited with their owners by producing pet collars having preassigned indicia thereon. The preassigned indicia on each collar include a different preassigned unique code identification number for each collar and a telephone number of a central station where the identify of the owner of each pet is stored. The pet collars are then dispensed to owners of pets. Data concerning the identity of pet owners to whom the collars are dispensed and the preassigned unique code identification numbers on the dispensed pet collars are then reported to the central station. The reported data are stored at the central station. The collars are placed on pets of owners to whom the collars are dispensed. The telephone number on the collar of the lost pet is then read. The central station is then contacted by calling the telephone number on the collar of the lost pet. During the contact of the previous step, the preassigned unique code identification number on the collar of the lost pet carrying the collar is reported to the central station. At the central station, the reported preassigned code identification number is correlated with the stored data concerning the identity of the owner of the pet to enable the pet and owner to be reunited.

Preferably, the reported and stored data include the name, telephone number and/or address of the pet owner and sufficient identification information to associate the preassigned unique code identification number with a specific pet.

In the preferred embodiment, the owner is instructed to report the lost pet to the central station. The owner reports the fact of the pet being lost to the central station. The owner, during the reporting step, communicates to the central station the preassigned unique code identification number for the lost pet. The central station reveals the identity of the pet owner only after the owner has reported and communicated as set forth above.

In accordance with another aspect of the invention, a system for reuniting lost pets with their owners comprises a set of pet collars having preassigned indicia thereon. The preassigned indicia on the collars include a different preassigned unique code identification number for each collar and a telephone number of a central station where the identity of the owner of each pet is stored. The pet collars are dispensed to owners of pets. The central station has a telephone receiver terminal and a data processor system that stores data representing (a) the identity of pet owners to whom the collars are dispensed and (b) the preassigned unique code identification numbers on the dispensed pet collars. The data processor system includes means for correlating a reported preassigned unique code identification number read from the collar of a lost pet with the stored data concerning the identity of the owner of the pet to enable the pet and owner to be reunited.

In one embodiment the indicia are directly embossed on the collars in the set.

In accordance with a further aspect of the invention, lost pets are reunited with their owners by embossing directly on a set of pet collars preassigned indicia, including a different preassigned unique code identification number for each collar in the set and a telephone number of a central station where the identity of the owner of each pet is stored. The pet collars are then dispensed to owners of pets. Data concerning the identity of pet owners to whom the collars are dispensed and the preassigned unique code identification numbers on the dispensed pet collars are then reported to the central station. The reported data are stored at the central station. The collars are placed on pets of owners to whom the collars are dispensed. The telephone number on the collar of the lost pet is then read. The central station is then contacted buy calling the telephone number on the collar of the lost pet. During the contact of the previous step, the preassigned unique code identification number on the collar of the lost pet carrying the collar is reported to the central station. At the central station, the reported preassigned code identification number is correlated with the stored data concerning the identity of the owner of the pet to enable the pet and owner to be reunited.

BRIEF DESCRIPTION OF THE DRAWINGS

FIG. 1 illustrates components of a preferred embodiment of the invention.

FIG. 2 shows pets wearing the collars of the preferred embodiment.

FIG. 3 is an enlarged view of a collar and tag of the preferred embodiment.

BRIEF DESCRIPTION OF THE PREFERRED EMBODIMENT

Figure 4:
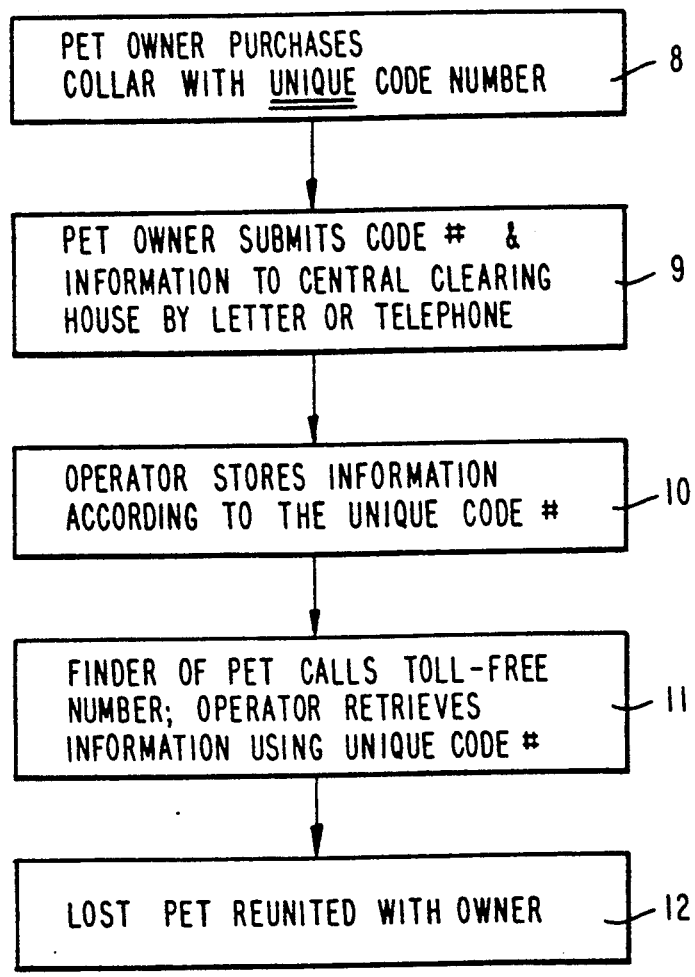
FIG. 4 illustrates the steps of the preferred method.

FIG. 1 shows essential components of the system of the preferred embodiment. A central clearing house 1 includes a telephone call-in center represented by telephone 2. The telephones may be accessible by dialing a toll-free number, such as the "800" numbers provided by long-distance telephone services such as AT&T, MCI, and GTE.

Preferably, the number is easily recognizable and identifiable with the clearing house. Connected with each telephone 2 is a terminal 3 through which information about pets and their owners can be entered into and retrieved from a central data base 4, which may be a mainframe or minicomputer, or, for example, a magnetic or optical disk storage unit.

The information about the pets and their owners is stored according to a code number permanently affixed to pet collar 5. FIGS. 2 and 3 show in detail the design and use of the preferred pet collar. The collar should be made of a durable material such as a leather or plastic and should be able to withstand weather conditions, scratching by the pet, and so forth. The collar band 7 may be of known construction, and can be varied to suit the tastes of individual pet owners and also the type of pet. It is contemplated that the primary use for the collars will be for dogs and cats, but the collars could be adapted for use on any other pet capable of wearing a collar and of getting lost.

Permanently attached to or imprinted on the collar is a code number (XXX000X in the drawing) which is unique to the collar. The code number may be imprinted by, for example, embossing it directly onto the band of the collar, or attached by permanently affixing a tag 6 to the collar. The code may be imprinted on the tag by any known method, or engraved if the tag is made of metal or plastic. The tag may also be made with attaching means such as straps for use with an ordinary collar that the owner may already possess.

Along with the code, the above-mentioned toll-free telephone number is also affixed to or imprinted on the collar, as well as instructions relating to its use, such as: "For Information about Me and My Owner, Please call 1-800-XXX-XXXX Toll-Free" or "If Found, Please Call 1(800) XXX-XXXX Toll-Free".

When a pet wearing collar 5 is found, the finder is directed to call the toll-free number and an operator will ask for the code number. Once the code number is obtained from the finder, it can be entered on terminal 3, and information about the pet and its owner retrieved from data base 4. It is contemplated that the information retrieved might include instructions from the owner not to give out the owner's telephone number unless the pet is reported lost. In that case, the retrieved information will also include whether or not the pet has been reported lost.

The information is entered into the data base 4 when the owner contacts the clearing house, by telephone or by filling out a form, after purchasing the collar or tag. The information should include, at least, the name and telephone number or address of the pet's owner and sufficient identification information to ensure that it is specific to a given pet (e.g., breed, color, etc.). Also, the pet's name and its license number may be stored. It is contemplated that some owners may wish to include other information such as the pet's favorite food, veterinary advice or handling information. Other owners may wish to offer a standing reward for the return of their beloved pet, while others may worry more about privacy and include only a telephone number, not to be given out unless the pet is first reported lost by the owner.

In practice, the information may be stored on a subscription basis, the subscription order form or instructions being included in the packaging of the collar. However, the manner in which the system is marketed forms no part of the instant invention; any convenient marketing system may be used with the unique system and collar described above.

In order to expedite manufacturing, the code numbers may be imprinted serially, i.e., in numerical order, which is far more efficient than imprinting different personalized information on each collar or tag as was the case in the prior art. The only information needed on the collar itself other than the code numbers is the toll-free telephone number, and brief instructions to the finder of the lost pet to call the number, meaning that manufacture of the collar or tag can be completely automated by employing computer controlled printing or embossing devices without the need for human intervention.

FIG. 4 shows a preferred method by which the preferred system can be used to find a lost pet. Reference numeral 8 designates the step of purchasing the collar or tag with the unique code number. As part of the packaging material, the purchasing pet owner will find instructions on calling the central clearing house, or on filling out a form and mailing it to the central clearing house with information about the pet. In the step designated "9", the pet owner gives the central clearing house the unique code number and also all information to be stored such as his or her telephone number, the name of the pet, identifying information, and any other information that the pet owner wishes to have stored. Then, in the step designated by the reference numeral 10, the operator at the clearing house, or a mail clerk, stores the information under the unique code number given by the owner, after which the information can be accessed simply by entering the unique code number. When the pet is lost, the finder of the pet calls the toll-free number, and the operator retrieves the information stored under the unique code number, as indicated by numeral 11. The operator may verify whether the pet has been reported lost before giving out the information, or the operator may immediately give the stored information to the finder. The finder will then have enough information to locate the owner of the pet, and the lost pet will be reunited with the owner as indicated in box 12. If the owner has given instructions as to the care and handling of the pet, the finder can further ensure the pet's comfort and safety until the pet's owner is actually contacted.

If the finder of the pet is an animal control officer, the pet may be spared the fate which awaits its fellow strays whose owners cannot be located. Furthermore, whether or not the pet has been licensed can be easily verified by the officer in case the pet's license tags have been lost or damaged.

Essentially, then, the invention includes a method, a system, and a collar or tag which provides both privacy and peace of mind for the pet owner, ensuring that if his or her pet is lost, the finder will be able to quickly identify the pet and return it to its owner. While the invention has been illustrated and described in the foregoing embodiments, it will be recognized that variations and changes may be made therein without departing from the invention claimed.

What is claimed is:

1. In a method of reuniting lost pets with their owners comprising
   (1) producing pet collars having preassigned indicia thereon, the preassigned indicia on each collar including a different preassigned unique code identification number for each collar and a telephone number of a central station where the identity of the owner of each pet is stored;
   (2) then dispensing the pet collars to owners of pets;
   (3) then reporting data concerning the identity of pet owners to whom the collars are dispensed and the preassigned unique code identification numbers on the dispensed pet collars to the central station;
   (4) storing the reported data at the central station;
   (5) placing the collars on pets of owners to whom the collars are dispensed;
   (6) then reading the telephone number on the collar of the lost pet;
   (7) then contacting the central station by calling the telephone number on the collar of the lost pet;
   (8) during the contact of step (7) reporting to the central station the preassigned unique code identification number on the collar of the lost pet carrying the collar; and
   (9) at the central station correlating the reported preassigned code identification number with the stored data concerning the identity of the owner of the pet to enable the pet and owner to be reunited.

2. The method of claim 1 wherein the reported and stored data include the name, telephone number and/or address of the pet owner and sufficient identification information to associate the preassigned unique code identification number with a specific pet.

3. The method of claim 1 further including instructing the owner to report the lost pet to the central station, the owner (a) reporting the fact of the pet being lost to the central station, (b) the owner during the reporting step communicating to the central station the preassigned unique code identification number for the lost pet, the central station revealing the identity of the pet owner during step (7) only after the owner has reported and communicated during steps (a) and (b).

4. A system for reuniting lost pets with their owners comprising
   a set of pet collars having preassigned indicia thereon, the preassigned indicia on the collars including a different preassigned unique code identification number for each collar and a telephone number of a central station where the identity of the owner of each pet is stored;
   the pet collars being dispensed to owners of pets;
   the central station having a telephone receiver terminal and a data processor system storing data representing the identity of pet owners to whom the collars are dispensed and the preassigned unique code identification numbers on the dispensed pet collars; and
   the data processor system including means for correlating a reported preassigned unique code identification number read from the collar of a lost pet with the stored data concerning the identity of the owner of the pet to enable the pet and owner to be reunited.

5. The system of claim 4 wherein the indicia are directly embossed on the collars in the set.

6. In a method of reuniting lost pets with their owners comprising
   (1) embossing directly on a set of pet collars preassigned indicia, the preassigned indicia on the collars including a different preassigned unique code identification number for each collar in the set and a telephone number of a central station where the identity of the owner of each pet is stored;
   (2) then dispensing the pet collars to owners of pets;
   (3) then reporting data concerning the identity of pet owners to whom the collars are dispensed and the preassigned unique code identification numbers on the dispensed pet collars to the central station;
   (4) storing the reported data at the central station;
   (5) placing the collars on pets of owners to whom the collars are dispensed;
   (6) then reading the telephone number on the collar of the lost pet;
   (7) then contacting the central station by calling the telephone number on the collar of the lost pet;
   (8) during the contact of step (7) reporting to the central station the preassigned unique code identification number on the collar of the lost pet carrying the collar; and
   (9) at the central station correlating the reported preassigned code identification number with the stored data concerning the identity of the owner of the pet to enable the pet and owner to be reunited.

7. The method of claim 6 wherein the reported and stored data include the name, telephone number and/or address of the pet owner and sufficient identification information to associate the preassigned unique code identification number with a specific pet.

8. The method of claim 6 further including instructing the owner to report the lost pet to the central station, the owner (a) reporting the fact of the pet being lost to the central station, (b) the owner during the reporting step communicating to the central station the preassigned unique code identification number for the lost pet, the central station revealing the identity of the pet owner during step (7) only after the owner has reported and communicated during steps (a) and (b).

* * * * *